United States Patent
Kojima

(10) Patent No.: US 11,734,868 B2
(45) Date of Patent: Aug. 22, 2023

(54) MOTION RETARGETING BASED ON DIFFERENTIABLE RENDERING

(71) Applicant: SONY GROUP CORPORATION, Tokyo (JP)

(72) Inventor: Tamaki Kojima, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 107 days.

(21) Appl. No.: 17/379,281

(22) Filed: Jul. 19, 2021

(65) Prior Publication Data

US 2023/0015037 A1    Jan. 19, 2023

(51) Int. Cl.
| | |
|---|---|
| *G06T 13/40* | (2011.01) |
| *G06T 17/00* | (2006.01) |
| *G06T 7/70* | (2017.01) |
| *G06T 7/80* | (2017.01) |
| *G06T 19/20* | (2011.01) |

(52) U.S. Cl.
CPC ............. *G06T 13/40* (2013.01); *G06T 7/70* (2017.01); *G06T 7/80* (2017.01); *G06T 17/00* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 8,803,889 B2 | 8/2014 | Perez et al. | |
| 2010/0020073 A1* | 1/2010 | Corazza ............... | G06T 13/40 345/474 |
| 2016/0086349 A1* | 3/2016 | Shotton ................ | G06T 7/75 382/103 |
| 2016/0267699 A1* | 9/2016 | Borke .................. | G06F 3/017 |

FOREIGN PATENT DOCUMENTS

JP   2012-113438 A   6/2012

OTHER PUBLICATIONS

Carranza et al., "Free-Viewpoint Video of Human Actors", Jul. 2003, ACM Transactions on Graphics (TOG), vol. 22, No. 3, pp. 569-577 (Year: 2003).*
Theobalt, et al., "Enhancing silhouette-based human motion capture with 3D motion fields", Proceedings of the 11th Pacific Conference on Computer Graphics and Applications, Oct. 8-10, 2003, 09 pages.

* cited by examiner

*Primary Examiner* — Kent W Chang
*Assistant Examiner* — Jonathan M Cofino
(74) *Attorney, Agent, or Firm* — Chip Law Group

(57) ABSTRACT

Provided is a system that receives a three-dimensional (3D) skinned model of a first object and a set of images of a second object. The second object is same as or structurally similar to the first object in appearance. The system executes a differentiable rendering operation to generate a first image which includes a contour of the 3D skinned model. The system further generates a reference image which includes a contour of the second object, based on the received set of images. The system updates first values of bone parameters associated with the 3D skinned model based on a difference between the generated first image and the generated reference image. The system updates the 3D skinned model based on the updated first values of the bone parameters.

14 Claims, 4 Drawing Sheets

MOTION RETARGETING BASED ON DIFFERENTIABLE RENDERING

CROSS-REFERENCE TO RELATED APPLICATIONS/INCORPORATION BY REFERENCE

None.

FIELD

Various embodiments of the disclosure relate to motion-capture, motion retargeting, and three-dimensional (3D) modeling technology. More specifically, various embodiments of the disclosure relate to a system and method for motion retargeting based on differentiable rendering.

BACKGROUND

Advancements in the field of three-dimensional (3D) computer graphics and 3D modeling have provided multiple techniques that help to create 3D models and visualize real objects in a 3D computer graphics environment. 3D models, such as 3D character models, are increasingly used in animated movies, games, and virtual-reality systems to enhance user experience. These 3D models may be animated using typical motion capture and motion retargeting methods. Typically, motion capture corresponds to a process of recording the movement (or motion) of a real object (such as a running dog). Motion Retargeting corresponds to a process of transferring the recorded movement (or motion) of the real object to the virtually generated 3D object so that the movement of the virtual generated 3D object seems natural in the animated movies, games, and virtual-reality systems.

In conventional approaches for motion-capture and motion retargeting, the motion of an object may be captured in a motion capture studio and the object may wear a motion capture suit. The captured motion may be retargeted to a 3D model which may have a skeletal structure somewhat different from the skeletal structure of the object. To retarget the motion, multiple hand-tuned processes may be required to retarget the motion of each bone of the object to a correspond bone of the 3D model. Therefore, such approaches may include huge number of steps and may therefore be expensive, time-consuming, cumbersome, and error prone.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for motion retargeting based on differentiable rendering, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
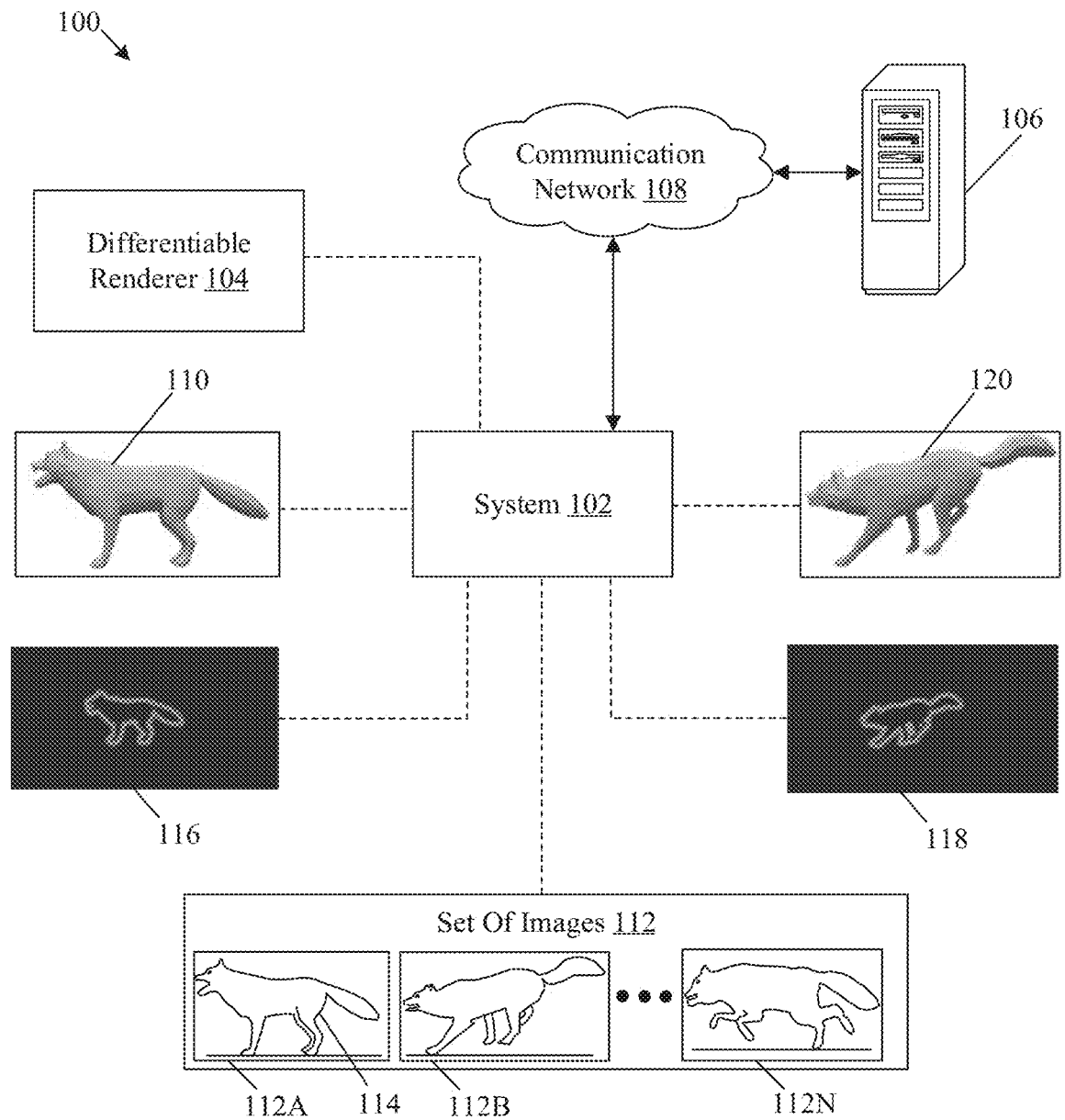
FIG. 1 is a block diagram that illustrates an exemplary network environment for motion retargeting based on differentiable rendering, in accordance with an embodiment of the disclosure.

The following described implementations may be found in the disclosed apparatus and method for motion retargeting based on differentiable rendering. Exemplary aspects of the disclosure provide a system that may be configured to retarget motion from a first object to a three dimensional (3D) model of the first object or any other object similar to the first object quickly and effectively as compared to the conventional techniques of motion retargeting. The disclosed system may be configured to receive a three-dimensional (3D) skinned model of a first object (such as a dog). In addition, the disclosed system may be configured to receive a set of images of a second object. The second object may be same as the first object or may be structurally similar to the first object in appearance. For example, if the first is a dog, then the second object may be a dog (same as the first object) or a structurally similar object such as a jackal, a coyote, or a wolf. In some instances, while the second object may be a real-world object, the first object may or may not correspond to a real-world object. For example, the first object may be an alien or a fictious humanoid character from a comic book and the second object may be a real-world object that may resemble the alien or fictious character or may have common body features.

The disclosed system may be configured to generate a first image which includes a first contour of the received 3D skinned model. The first image may be generated based on execution of a differentiable rendering operation. The disclosed system may be further configured to generate a reference image which includes a reference contour of the second object. The reference image may be generated based on the received set of images. The disclosed system may be further configured to update first values of bone parameters associated with the 3D skinned model. Such values of bone parameters may be updated based on a difference between the generated first image and the generated reference image. In multiple iterations, the 3D skinned model may be updated by modifying the bone parameters in several iterations, until a pose of the updated 3D skinned model (as represented in the first image) matches that of the second object in the reference image. In each of such iterations, the 3D skinned model may be updated based on the updated first values of the bone parameters.

In conventional approaches for motion-capture and motion-retargeting, the motion of an object may be captured in a motion capture studio and the object may wear a motion capture suit. The captured motion may be retargeted to a 3D model which may have a skeletal structure different from the skeletal structure of the object. To retarget the motion, multiple hand-tuned processes may be required to retarget motion of each bone of the second object to the correspond bone in the 3D model of the first object. Therefore, the conventional approach described above may require a huge number of steps and may be expensive, time-consuming, cumbersome, as well as subjective to human error. Other approaches for motion-capture and motion-retargeting may include training a pose detector model to obtain generic 3D skeletal joints. However, the training of the pose detector model may require huge amount of data to train and may only work on specific species/types of objects. If the object species/type changes, re-collection of data and re-training of the model for new object species/type may be required. This approach may be time-consuming as well as cumbersome.

In contrast to the conventional approaches, the disclosed system may capture the motion of an object from a video sequence. The disclosed system may rely on a differentiable rendering operation to iteratively optimize the values of bone parameters using backpropagation and may automatically retarget the motion from the video sequence to the 3D model based on optimal values of the bone parameters. By modeling the problem of motion retargeting as an optimization problem, the system may provide a solution, in which a user may have to merely select the skinned model and a target video sequence for motion retargeting and may have to click on an option to trigger automated execution of operations. Such operations may consume less time to obtain final values of bone parameters for motion-retargeting as compared to conventional approaches.

Since no pose detection model is used, the disclosed system may overcome the need of data collection and training of pose detection models. The object in the video sequence may not be required to wear any motion capture suit or device. The video sequence may be captured in environments, which may not be limited to motion capture studios.

FIG. 1 is a block diagram that illustrates an exemplary network environment for motion retargeting based on differentiable rendering, in accordance with an embodiment of the disclosure. With reference to FIG. 1, there is shown a network environment 100. The network environment 100 may include a system 102, a differentiable renderer 104, and a server 106. The system 102, the differentiable renderer 104, and the server 106 may be communicatively coupled to each other, via a communication network 108. In an embodiment, the differentiable renderer 104 may be included in the system 102. There is further shown a three-dimensional (3D) skinned model 110 of a first object, a set of images 112 of a second object 114, a first image 116, and a reference image 118. The first subject may be same as or structurally similar to the second object 114. With reference to FIG. 1, there is further shown an updated 3D skinned model 120 of the first object.

The system 102 may include suitable logic, circuitry, and interfaces that may be configured to retarget the motion of the second object 114 (as depicted in the set of images 112) to the 3D skinned model 110 of the first object. For retargeting, the system 102 may use the differentiable renderer 104 for several iterations to obtain different sets of values of bone parameters parametrically associated with joints of the 3D skinned model 110. In several iterations, the values of the bone parameters may be used to update the 3D skinned model 110, i.e. to move the joints of the 3D skinned model 110 so that the pose of the 3D skinned model 110 matches (or nearly matches) that of the second object in the set of images 112. Example implementations of the system 102 may include, but are not limited to, a cloud server (public, private, or hybrid), a distributed computing server or a cluster of servers, a Software-as-a-Service (SaaS) application server, an edge computing system that includes a network of distributed compute/edge nodes), a mainframe system, a workstation, a personal computer, or a mobile device.

In an embodiment, the system 102 may include a frontend subsystem and a backend subsystem. The frontend subsystem may be a client-side application, accessible on user devices. The frontend subsystem may be configured to display a user interface (UI) which may include UI elements to allow users to provide inputs, view 3D models or video video/image sequences, create a workflow for motion retargeting, trigger execution of the workflow, and view an animated movement of the 3D models. The backend subsystem may include a server-side application, which may execute all instructions related to motion retargeting.

The differentiable renderer 104 may include suitable logic, circuitry, and interfaces that may be configured to receive, as an input, model data that includes the 3D skinned model 110 and a set of camera parameters associated with the one or more cameras that captured the set of images 112. Based on the input, the differentiable renderer 104 may generate a silhouette image (such as the first image 116) of the 3D skinned model 110 from a specific viewpoint. The pose of the 3D skinned model 110 and the pose of the first object in the silhouette image may remain same. The differentiable renderer 104 makes use of suitable algorithms to compute gradients ($\partial I/\partial \phi$) of an output image (I, the silhouette image or an image with contour of a 3D skinned model) with respect to input parameters ($\phi$) in order to optimize for a specific goal (loss function). The input parameters ($\phi$) may include the model data. The differentiable renderer 104 may enable the system 102 to perform a gradient-based optimization (as described in FIGS. 1 and 3, for example) in real-time or near real time.

In an embodiment, the differentiable renderer 104 may be implemented as a software component of a 3D render engine (such as a 3D game engine) installed on the system 102. The differentiable renderer 104 may execute operations by use of various device resources or software resources of the system 102. Example of such resources may include, but is not limited to, a 3D game engine, a 3D graphics engine, an Application-Specific Integrated Circuit (ASIC) processor, a co-processor such as a Vision Processing Unit, a 3D mesh codec, a Graphics Processing Unit (GPU), a Reduced Instruction Set Computing (RISC) processor, a Complex Instruction Set Computing (CISC) processor, an x86-based processor, a microcontroller, a central processing unit (CPU), and/or other circuits.

The server 106 may include suitable logic, circuitry, and interfaces that may be configured to store the received the 3D skinned model 110 of the first object, the received set of images 112, the generated first image 116, and the generated reference image 118. In accordance with an embodiment, the server 106 may be further configured to store values of bone parameters associated with the 3D skinned model 110. The server 106 may be implemented as a cloud server and may execute operations through web applications, cloud applications, HTTP requests, repository operations, file transfer, and the like. Other example implementations of the server 106 may include, but are not limited to, a database server, a file server, a web server, a media server, an application server, a mainframe server, or a cloud computing server.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and system 102 as two separate entities. In certain embodiments, the functionalities of the server 106 can be incorporated in its entirety or at least partially in the system 102, without a departure from the scope of the disclosure.

The communication network 108 may include a communication medium through which the system 102, the differentiable renderer 104, and the server 106 may communicate with each other. Examples of the communication network 108 may include, but are not limited to, the Internet, a cloud network, a Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to receive one or more inputs (for example, via the front-end subsystem) to configure or prepare a workflow to initialize motion retargeting operations. The workflow may be configured or prepared on, for example, a game designing software or an animation software. Through the workflow, the user may select a target rigged/skinned character model (such as the 3D skinned model 110) of a first object and a set of images (such as the set of images 112) or a video feed of a second object as reference. The objective of the workflow is to trigger execution of the motion retargeting operations, as described herein. When triggered, such operations may be executed to recover motion of the second object from the set of images and apply the recovered motion to the target rigged/skinned character model. The motion may involve articulate motion of joints (such as bone joints).

The system 102 may be configured to receive the 3D skinned model 110 of the first object in an initial pose, such as a T-pose. The 3D skinned model 110 may include a set of joints which may be parametrically associated with the bone parameters. The system 102 may be further configured to receive the set of images 112 of a second object (such as the second object 114). If the set of images 112 corresponds to a video feed, then the second object 114 may appear in motion in the received set of images 112. In an embodiment, the set of images 112 may include the second object 114 from one or more viewpoints.

The second object 114 may be same as or structurally similar to the first object in terms of appearance. For example, if the first object is a dog, then the second object may be a dog (same as the first object) or a structurally similar object such as a jackal, a coyote, or a wolf. In some instances, while the second object may be a real-world object, the first object may or may not correspond to a real-world object. For example, the first object may be an alien or a fictious humanoid character from a comic book and the second object may be a real-world object that may resemble the alien or fictious character or may have common body features.

After the 3D skinned model 110 and the set of images 112 is received, the objective is to first initialize the bone parameters with seed values (which can be referred to as first values of bone parameters) and then to iteratively update the seed values of the bone parameters till the bone parameters of the 3D skinned model 110 correspond to the pose of the second object 114 in at least one image of the set of images 112.

In each iteration, the system 102 may be configured to execute a differentiable rendering operation to generate a first image (such as the first image 116) of the first object. The first image 116 may be a silhouette image and may include a contour of the 3D skinned model 110 from a specific viewpoint. The specific viewpoint may be determined based on camera parameters associated with the set of images 112. In the same iteration, the system 102 may be configured to generate a reference image 118 which may include a contour of the second object 114. The reference image 118 may be generated based on the received set of images 112. Similar to the first image 116, the reference image 118 may be a silhouette image of the second object 114 (as depicted in an image 112A). Details about the generation of the first image 116 and the reference image 118 are provided, for example, in FIG. 3.

In the same iteration, the system 102 may be configured to update first values (or seed values in case of first iteration) of the bone parameters associated with the 3D skinned model 110. The first values may be updated based on a difference between the generated first image 116 and the generated reference image 118. In an embodiment, the difference may be used to compute an error or loss and to backpropagate the error/loss to update the first values of the bone parameters. In the same iteration, the system 102 may be configured to update the 3D skinned model 110 based on the updated first values of the bone parameters. The 3D skinned model 110 may be updated by updating a position/orientation of the bone joints which may be parametrically associated with the bone parameters. In case the loss (based on the difference) is below a threshold loss (for example, less than 0.01 or 0.05), then the system 102 may output the updated 3D skinned model 120 as a final result of motion retargeting. In case the loss (based on the difference) is above the threshold loss, then the system 102 may continue to next iteration and all the operations of previous iteration may be re-executed again till the loss is below the threshold loss. The last iteration may result in the updated 3D skinned model 120, whose pose may match the pose of the second object 114 (as depicted in the image 112B) and may differ from the initial pose of the 3D skinned model 110.

The updated 3D skinned model 120 may be utilized in several applications, such as, but not limited to, an animated 3D object in a Virtual Reality (VR) or Augmented Reality (AR) environment, a game character in a video game, and an animated object model in Visual Effects (VFX), Computer-Generated Imagery (CGI), or a 3D model-based conferencing application.

Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may include the system 102 and a display device. In some other embodiments, the differentiable renderer 104 may be integrated within the system 102 without deviation from the scope of the invention.

Figure 2:
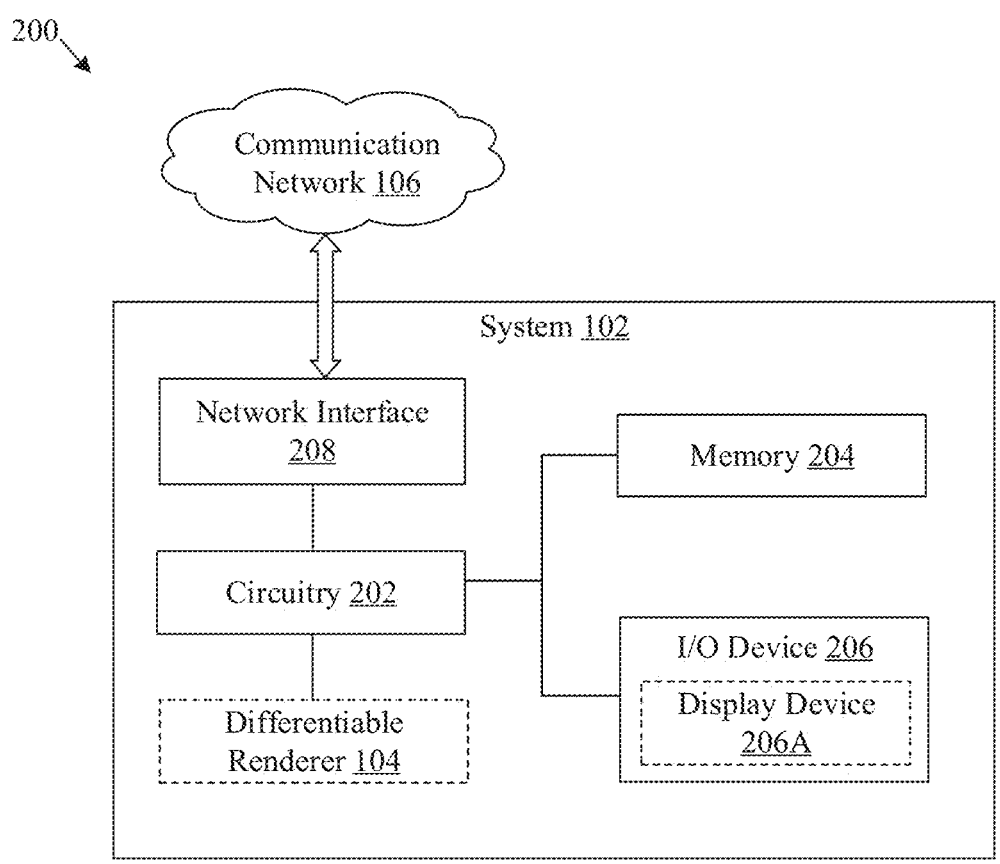
FIG. 2 is a block diagram that illustrates an exemplary system for motion retargeting based on differentiable rendering, in accordance with an embodiment of the disclosure.

FIG. 2 is a block diagram that illustrates an exemplary system for motion retargeting based on differentiable rendering, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, and an input/output (I/O) device 206. The I/O device 206 may include a display device 206A which may render a User Interface. The system 102 may further include a network interface 208. The circuitry 202 may be communicatively coupled to the memory 204, the I/O device 206, and the network interface 208. The circuitry 202 may be configured to communicate with the server 106 by use of the network interface 208. With reference to FIG. 2, there is further shown the differentiable renderer 104 which may be included in the system 102.

The circuitry 202 may include suitable logic, circuitry, and interfaces that may be configured to execute program instructions associated with different operations to be executed by the system 102 for motion retargeting, based on a differentiable rendering operation. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the received 3D skinned model 110, the received set of images 112, the generated first image 116, the generated reference image 118, and the updated 3D skinned model 120. In some embodiments, the memory 204 may be further configured to store estimated set of camera parameters, initial values of bone parameters, updated values of bone parameters, and other information. In another embodiment, the memory 204 may be configured to store a set of instructions to compute a difference between the generated first image 116 and the generated reference image 118. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. For example, the circuitry 202 may receive inputs or selections of the 3D skinned model 110, the set of images 112, and a threshold loss via the I/O device 206. The I/O device 206 which includes various input and output devices, may be configured to communicate with the circuitry 202. Examples of the I/O device 206 may include, but are not limited to, a touch screen, a keyboard, a mouse, a joystick, a microphone, a display device (for example, the display device 206A), and a speaker.

The display device 206A may include suitable logic, circuitry, and interfaces that may be configured to render the updated 3D skinned model 120 of the first object. In some embodiments, the display device 206A may be an external display device associated with the system 102. The display device 206A may be a touch screen which may enable a user to provide a user-input via the display device 206A. The touch screen may be at least one of a resistive touch screen, a capacitive touch screen, or a thermal touch screen. The display device 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 206A may refer to a display screen of a head mounted device (HMD), a smart-glass device, a see-through display, a projection-based display, an electro-chromic display, or a transparent display.

The network interface 208 may comprise suitable logic, circuitry, and interfaces that may be configured to facilitate communication between the system 102, the differentiable renderer 104, and the server 106, via the communication network 108. The network interface 208 may be implemented by use of various known technologies to support wired or wireless communication of the system 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation NR, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operation of the circuitry 202 is described in detail, for example in FIGS. 3, and 4.

Figure 3:
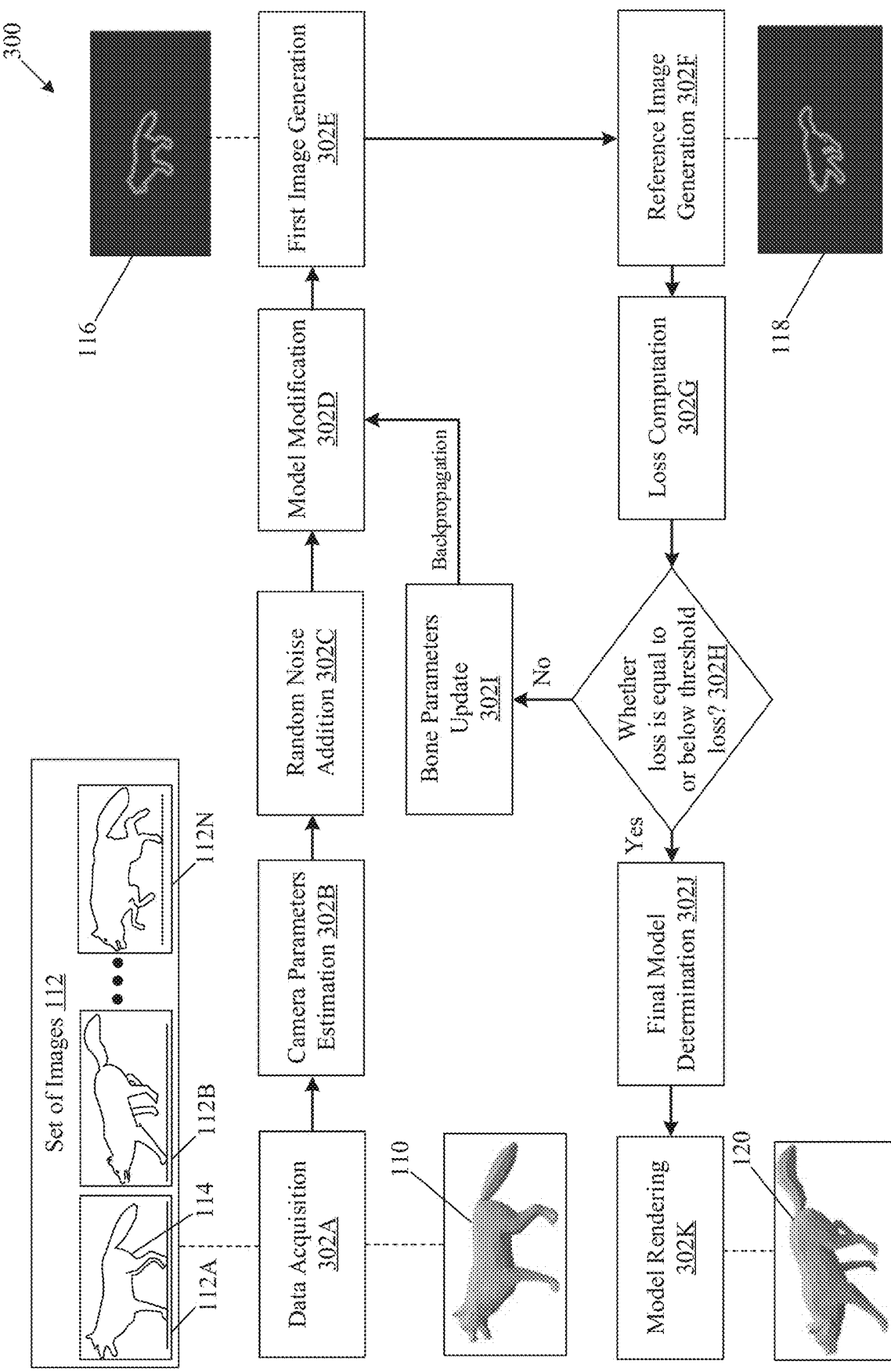
FIG. 3 is a diagram that illustrates exemplary operations for motion retargeting based on differentiable rendering, in accordance with an embodiment of the disclosure.

FIG. 3 is a diagram that illustrates exemplary operations for motion retargeting based on differentiable rendering, in accordance with an embodiment of the disclosure. FIG. 3 is explained in conjunction with elements from FIG. 1 and FIG. 2. With reference to FIG. 3, there is shown a block diagram 300 that illustrates exemplary operations from 302A to 302K, as described herein. The exemplary operations illustrated in the block diagram 300 may start at 302A and may be performed by any computing system, apparatus, or device, such as by the system 102 of FIG. 1 or circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302A, a data acquisition operation may be performed. In the data acquisition operation, the circuitry 202 may be configured to receive the 3D skinned model 110 of a first object. The first object may be an animate object (such as a person, an animal, an alien character, or a fictious/imaginary character) or an inanimate object, such as a humanoid or animal robot.

In an embodiment, the circuitry 202 may receive one or more images that may include the first object. Based on the one or more images of the first object, the circuitry 202 may generate a 3D model of the first object. As an example, the 3D model may be generated from the images using a photogrammetry-based method (such as structure from motion (SfM)), a method which requires stereoscopic images, or a method which requires monocular cues (such as shape from shading (SfS), photometric stereo, or shape from texture (SfT)). Details of such methods have been omitted from the disclosure for the sake of brevity. The 3D model of the first object may be a 3D mesh (with or without texture) that may resemble the shape of first object. The 3D mesh may use polygons to define the shape or the geometry of the first object. The detailed implementation for generation of the 3D model may be known to one skilled in the art, and therefore, a detailed description for the generation of the 3D model has been omitted from the disclosure for the sake of brevity.

Based on a user input or a set of computer-executable instructions, the circuitry 202 may be configured to rig the 3D model of the first object by a process of 3D rigging. The 3D rigging may correspond to the process for creation of a virtual skeleton for the generated 3D model of the first object. The created skeleton may include a set of joints (or bones) which may be parametrically associated with the bone parameters. Specifically, each of the set of joints may be a point of articulation that may be created to control the movement of the 3D model. The bone parameters may include a bone rotation parameter and/or other parameters, such as a bone/joint position a hierarchical dependence, and a scale of the corresponding bone. By way of example, and not limitation, each joint may be associated with at least a first bone and a second bone. The movement of the first bone may incur a movement of the second bone as the second bone may be hierarchically dependent on the first bone. In some embodiments, the bone parameters may also include a transformation parameter associated with each bone. The transformation parameter associated with a first bone may indicate a maximum value of rotation (in degrees) of the first bone in response to a movement a second bone that may be attached to the first bone via a joint.

After the 3D model is rigged, a skinned model (such as the 3D skinned model 110) may be generated by skinning the 3D rigged model using the virtual skeleton. The skinning of the 3D model may correspond to a process by which vertices of the rigged 3D model may bind with the joints of the virtual skeleton. In the 3D skinned model 110, vertices of the 3D skinned model may be parametrically associated with the joints of the virtual skeleton.

In an embodiment, the 3D skinned model 110 may be associated with an initial pose which may correspond to initial values of the bone parameters. The initial pose may be a default pose of the 3D skinned model 110. In some embodiments, the initial pose may be referred to as T-pose.

In the data acquisition operation, the circuitry 202 may be further configured to receive the set of images 112 of the second object 114. Similar to the first object, the second object 114 may be a real-world object (animate or inanimate). Each image of the set of images 112 may include the second object 114 from a particular viewpoint. The pose of the second object in the set of images 112 may change with time as the set of images 112 may be captured while the second object 114 may be moving. The pose of the second object 114 may be a target pose to be applied on the 3D skinned model 110 of the first object.

In an embodiment, the set of images 112 may be extracted from a video sequence in which the second object 114 may be in motion. In such a scenario, each of the set of images 112 may correspond to a frame of the video sequence. The second object 114 may same as or structurally similar to the first object in terms of appearance. For example, if the first object is a dog, then the second object 114 may be a jackal, a dog, a coyote, or a wolf.

At 302B, a camera parameter estimation may be performed. In the camera parameter estimation, the circuitry 202 may be configured to estimate a set of camera parameters based on received the set of images 112. The circuitry 202 may be configured to estimate each of the set of camera parameters associated with one or more cameras that captured the received set of images 112. Each camera parameter may correspond to a time or a duration in which the received set of images 112 is captured. The set of camera parameters may include, for example, intrinsic camera parameters and extrinsic camera parameters. The extrinsic camera parameters may be associated with a location and an orientation of the camera (camera co-ordinates) in real world system. The intrinsic camera parameters may be part of a camera matrix and may include a mapping between camera coordinates and pixel coordinates. In an embodiment, the circuitry 202 may be configured to estimate the set of camera parameters from the received set of images 112 using one or more methods such as, but not limited to, a simultaneous localization and mapping (SLAM) method.

Following operations from 302C to 302H may be executed for a number of iterations till values of the bone parameters for the 3D skinned model 110 correspond to the pose of the second object 114 (in one or more images of the set of images 112). In the first iteration, values of the bone parameters may be initialized with seed values (which may include a random noise added to the initial values of the bone parameters). In successive iterations, the seed values (may be referred to as first values) of the bone parameters may be updated and the 3D skinned model 110 may be updated till a difference (measured by a loss function) between a pose of an updated/modified 3D skinned model and the pose of the second object 114 is below a threshold. An iteration of the operations from 302C to 302H is described herein.

At 302C, a random noise addition may be performed. In the random noise addition operation, the circuitry 202 may be configured to add a random noise to the initial values of the bone parameters of the 3D skinned model 110. Based on the addition of the random noise, the circuitry 202 may be configured to update the initial values of the bone parameters to obtain the first values of the bone parameters. The first values of the bone parameters may be different from the initial values of the bone parameters.

At 302D, a model modification operation may be performed. In the model modification operation, the circuitry 202 may be configured to modify the received 3D skinned model 110 based on the first values (or the updated initial values) of the bone parameters to generate a modified 3D skinned model (also referred as a first 3D model). Specifically, the modification of the 3D skinned model 110 may correspond to a modification in the pose of the 3D skinned model 110. The pose of the modified 3D skinned model (or the first 3D model) may appear different from the initial pose of the 3D skinned model 110. For example, in case of the dog model, the leg joints of the model may be moved slightly based on the first values of the bone parameters.

In an embodiment, the circuitry 202 may be configured to compute a set of per-vertex transformations for the 3D skinned model 110. The computation may be based on a transformation method that may use the first values of the bone parameters as input. In an embodiment, the transformation method may include a linear blend skinning (LBS) method and a forward kinematics method. The detailed implementation of the transformation method may be known to one skilled in the art; therefore, a detailed description for the transformation method has been omitted from the disclosure for the sake of brevity. The computed set of per-vertex transformations may include information about new position of vertices (and rotation/translation of joints) of the 3D skinned model 110. The 3D skinned model 110 may be modified based on the computed set of per-vertex transformations.

At 302E, a first image may be generated. The circuitry 202 may be configured to generate the first image 116 which may include a contour of the modified 3D skinned model. In an embodiment, the first image 116 may be a silhouette image that includes the contour of the modified 3D skinned model from a specific viewpoint.

In order to generate the first image 116, the circuitry 202 may be configured to execute a differentiable rendering operation. In an embodiment, the differentiable rendering operation may be executed by the differentiable renderer 104. The execution of the differentiable rendering operation may include execution of a first operation and a second operation. In the first operation, model data may be generated and provided as an input to the differentiable renderer 104. The model data may include, but not limited to, the modified 3D skinned model and the estimated set of camera parameters (estimated at 302B). In the second operation, the first image 116 may be generated by application of the differentiable renderer 104 on the model data. In an embodiment, the received set of images 112 include the second object 114 from a viewpoint that is same as that of the contour of the first object in the generated first image 116.

In some embodiments, in addition to the first image 116 which includes the contour of the modified 3D skinned model, a depth image and an RGB image of the modified 3D skinned model may be generated by application of the differentiable renderer 104 on the model data. The detailed implementation of the differentiable rendering operation may be known to one skilled in the art; therefore, a detailed description for the differentiable rendering operation has been omitted from the disclosure for the sake of brevity.

At 302F, a reference image generation operation may be performed. In the reference image generation operation, the circuitry 202 may be configured to generate the reference image 118 based on the received set of images 112. In some embodiments, the reference image 118 may be generated based at least one image of the set of images 112. The generated reference image 118 may include a contour of the second object 114. In an embodiment, the reference image 118 may be a silhouette of the second object 114 in the image 112B. The circuitry 202 may apply one or more contour detection operations on the image 112B of the set of images 112 to generate the reference image 118.

At 302G, a loss computation may be performed. Before the loss is computed, the circuitry 202 may be configured to compute a difference between the generated first image 116 and the generated reference image 118. The difference between the generated first image 116 and the generated reference image 118 may be computed based on a similarity measure. By way of example, and not limitation, the similarity measure may be the Jaccard Index or the Intersection over Union (IoU).

The circuitry 202 may calculate the Jaccard Index or the IoU for the generated first image 116 and the generated reference image 118 and may compute the difference between the generated first image 116 and the generated reference image 118 based on the calculated Jaccard Index. An IoU that may be close to one (1) may imply that the difference between the two contours, i.e. the contour of the first image 116 and the contour of the reference image 118 is very small (implying a higher degree of overlap). In contrast, an IoU that may be close to zero (0) may imply that the difference between the two contours, i.e. the contour of the first image 116 and the contour of the reference image 118 is very large (implying a lower degree of overlap).

Based on the difference between the generated first image 116 and the generated reference image 118, the circuitry 202 may be configured to compute a loss. Specifically, the circuitry 202 may be configured to compute the loss based on a comparison of the computed difference with a reference value. For example, if the difference based on IoU is 0.9 and the reference is 1.0 (which implies a total overlap of contours), then the loss may be computed as 0.1 (i.e. 1.0-0.9). The computed loss may be used in a back propagation operation to update the bone parameters of the 3D skinned model 110, as described in 302I.

In an embodiment, the generated first image 116 and the generated reference image 118 may include depth information associated with the modified 3D skinned model and the received set of images 112, respectively. In such an embodiment, the circuitry 202 may be configured to compute a first difference between the depth information in the generated first image 116 and the depth information in the generated reference image 118 and to further compute the loss based on the computed first difference.

At 302H, it may be determined whether the computed loss is below a threshold loss. The threshold loss may be a maximum allowable loss, above which the pose of the updated/modified 3D skinned model may not correctly match the pose of the second object in the images (for example, the image 112A). The circuitry 202 may be configured to compare the computed loss with the threshold loss to determine whether or not a pose of the modified 3D skinned model matches a pose of the second object 114. In case the computed loss is below or equal to the threshold loss, control may pass to 302J. Otherwise, the control may pass to 302I.

At 302I, values of the bone parameters may be updated based on a backpropagation operation. The first values may be updated based on the determination (based on the comparison at 302H) that the pose of the modified 3D skinned model is different from the pose of the second object 114 (as depicted in the image 112B, for example).

The circuitry 202 may update, based on the backpropagation operation, the first values of the bone parameters to second values which may be different from the first values. The second values may include a random noise added at the time of the update. In an embodiment, the backpropagation operation may be executed on the system 102 to compute a gradient of the loss with respect to the first values of the bone parameters. Based on the computed gradient, the values to be used to update the first values of the bone parameters may be determined. In other words, the computed gradient may be used to backpropagate the loss to update the first values of the bone parameters. It should be noted that the computed loss may be backpropagated in each iteration only if the computed loss is above the threshold loss.

Based on the updated first values (or the second values) of the bone parameters, the circuitry 202 may be configured to update the 3D skinned model 110 or the modified 3D skinned model. With the update, vertices of the 3D skinned model 110 or the modified 3D skinned model may be moved to new positions based on movement of the joints. Thereafter, operations from 302C to 302H may be re-executed for a number of iterations to further update the second values or other values (in successive iterations) until the loss is below or equal to the threshold loss. If, after several iterations, the loss is determined to be below or equal to the threshold loss, then the control may pass to 302J.

In order to update the 3D skinned model 110 (or the modified 3D skinned model), the circuitry 202 may be configured to compute a set of per-vertex transformations. The computation may be based on a transformation method that may use the first values of the bone parameters as input. In an embodiment, the transformation method may include the LBS method and the forward kinematics method. The computed set of per-vertex transformations may include information about new position of vertices (and rotation/translation of joints) of the 3D skinned model 110 (or the modified 3D skinned model). The 3D skinned model 110 (or the modified 3D skinned model) may be updated based on the computed set of per-vertex transformations.

At 302J, a final model determination operation may be performed. In the final 3D model determination operation, the circuitry 202 may be configured to determine the updated 3D skinned model 120 (updated at 302I) as the final 3D model of the first object. The updated 3D skinned model 120 may be determined as the final model based on a determination (comparison at 302H) that the pose of the updated 3D skinned model matches the pose of the second object 114. Specifically, if the computed loss is less than the threshold loss, the pose of the updated 3D skinned model may be considered to match as or approximately match the pose of the second object 114 in the received set of images 112. if the computed loss is equal to or below the threshold in a first iteration, then the modified 3D skinned model (modified in a first iteration at 302D) may be determined as the final 3D model for rendering.

At 302K, a model rendering operation may be performed. In the model rendering operation, the circuitry 202 may be configured to render the final 3D model onto the display device 206A. In some embodiments, the final 3D model may be textured before rendering to generate a textured final 3D model. The textured final 3D model may be generated by UV mapping a texture map onto the final 3D model. UV mapping may correspond to a process of projecting one or more 2D images (texture maps) onto a surface of the final 3D model. In some embodiments, the final textured 3D model may be compressed for storage or other applications, such as 3D rendering, model exporting, or transmission to other devices.

The disclosed system 102 may successfully retarget the motion of the second object 114 to the received 3D skinned model 110 based on loss determination and backpropagation only. In comparison to the conventional approaches, the disclosed system may overcome the need of specialized motion capture studios. The disclosed system may quickly and effectively retarget the motion to the 3D skinned model of the first object in comparison to the conventional approaches.

Figure 4:
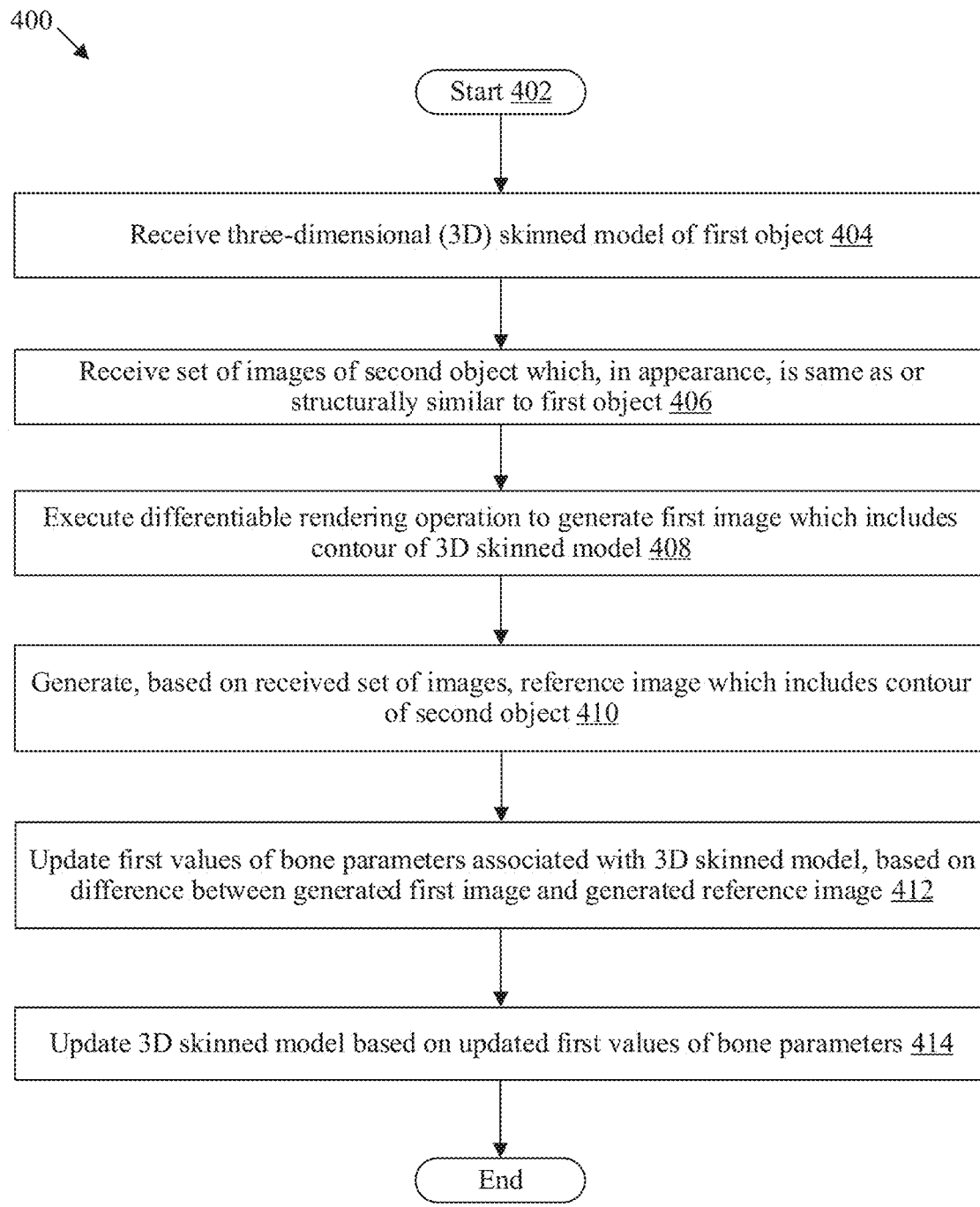
FIG. 4 is a flowchart that illustrates an exemplary method for motion retargeting based on differentiable rendering, in accordance with an embodiment of the disclosure.

FIG. 4 is a flowchart that illustrates an exemplary method for motion retargeting based on differentiable rendering, in accordance with an embodiment of the disclosure. FIG. 4 is described in conjunction with elements from FIGS. 1, 2, and 3. With reference to FIG. 4, there is shown a flowchart 400. The operations of the flowchart 400 may be executed in the system 102. The operations may start at 402 and proceed to 404.

At 404, the three-dimensional (3D) skinned model 110 of the first object may be received. In one or more embodiments, the circuitry 202 may be configured to the receive the 3D skinned model 110 of the first object.

At 406, the set of images 112 of the second object 114 may be received. The second object 114 may be same as or structurally similar to the first object in appearance. In one or more embodiments, the circuitry 202 may be configured to receive the set of images 112 of the second object 114 which in appearance may be same as or structurally similar to the first object.

At 408, the differentiable rendering operation may be executed. The differentiable rendering operation may be executed to generate the first image 116 that may include the contour of the 3D skinned model 110. In one or more embodiments, the circuitry 202 may be configured to execute the differentiable rendering operation to generate the first image 116 which includes a contour of the 3D skinned model 110.

At 410, the reference image 118 may be generated. The reference image 118 may be generated based on the received set of images 112. In one or more embodiments, the circuitry 202 may be configured to generate the reference image 118 which includes a contour of the second object 114 based on the received set of images 112.

At 412, the first values of bone parameters associated with the 3D skinned model 110 may be updated. The first values may be updated based on a difference between the generated first image 116 and the generated reference image 118. In one or more embodiments, the circuitry 202 may be configured to update the first values of bone parameters associated with the 3D skinned model based on a difference between the generated first image and the generated reference image.

At 414, the 3D skinned model 110 based on the updated first values of the bone parameters. In one or more embodiments, the circuitry 202 may be configured to update the 3D skinned model 110 based on the updated first values of the bone parameters. Control may pass to end.

Various embodiments of the disclosure may provide a non-transitory computer-readable medium and/or storage medium having stored thereon, instructions executable by a machine and/or a computer such as the system 102. The instructions may cause the machine and/or computer to perform operations that may include reception of a three-dimensional (3D) skinned model of the first object. The operations may further include reception of a set of images of a second object. The second object may be same as or structurally similar to the first object in appearance. The operations may further include executing a differentiable rendering operation to generate the first image which includes a contour of the 3D skinned model. The operations may further include generating a reference image based on the received set of images. The reference image may include a contour of the second object. The operations may further include updating first values of bone parameters associated with the 3D skinned model based on a difference between the generated first image and the generated reference image. The operations may further include updating the 3D skinned model based on the updated first values of the bone parameters.

Exemplary aspects of the disclosure may include a system (such as the system 102 of FIG. 1) that may include circuitry (such as the circuitry 202). The circuitry may be configured to receive a three-dimensional (3D) skinned model (such as the 3D skinned model 110) of a first object. The received 3D skinned model 110 may include a set of joints which are parametrically associated with the bone parameters. The received 3D skinned model 110 may be associated with an initial pose which may correspond to initial values of bone parameters. The circuitry 202 may be configured to receive a set of images (such as the set of images 112) of a second object (such as the second object 114). The second object 114 may be same as or structurally similar to the first object in appearance.

The circuitry 202 may be configured to estimate a set of camera parameters based on received the set of images 112. The circuitry 202 may be further configured to update the initial values of the bone parameters with first values which may be different from the initial values. The circuitry 202 may be configured to modify the received 3D skinned model based on the first values. The circuitry 202 may be further configured to execute a differentiable rendering operation to generate a first image (such as the first image 116) which includes a contour of the 3D skinned model 110. The execution of the differentiable rendering operation may include a first operation in which model data comprising the modified 3D skinned model and the estimated set of camera parameters is input to a differentiable renderer and a second operation in which the first image is generated by application of the differentiable renderer on the model data. The circuitry 202 may be further configured to generate a reference image (such as the reference image 118) which includes a contour of the second object based on the received set of images 112.

In an embodiment, the circuitry 202 may be further configured to compute a difference between the generated first image and the generated reference image, based on a similarity measure. The circuitry 202 may be further configured to compute a loss based on comparison of the computed difference with a reference value. The circuitry 202 may be further configured to compare the computed loss with a threshold loss to determine whether or not a pose of the updated 3D skinned model matches a pose of the second object 114.

In an embodiment, the circuitry 202 may be configured to update the first values of the bone parameters to second values which are different from the first values based on a backpropagation operation. The first values may be updated further based on the determination that the pose of the updated 3D skinned model is different from the pose of the second object.

In another embodiment, the circuitry 202 may be further configured to determine the updated 3D skinned model as a final 3D model of the first object based on the determination that the pose of the updated 3D skinned model matches the pose of the second object.

In an embodiment, the circuitry 202 may be further configured to compute a set of per-vertex transformations for the 3D skinned model based on a transformation method that uses the updated first values of the bone parameters as input. The update of the 3D skinned model may be based on the computed set of per-vertex transformations. The transformation method may include of one or more of a linear blend skinning (LBS) method and a forward kinematics method.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
circuitry configured to:
  receive a three-dimensional (3D) skinned model of a first object, wherein the received 3D skinned model is associated with an initial pose which corresponds to initial values of bone parameters associated with the received 3D skinned model;
  receive a set of images of a second object which, in appearance, is same as or structurally similar to the first object;
  estimate a set of camera parameters based on the received set of images;
  update, based on a random noise, the initial values of the bone parameters to first values which are different from the initial values;
  modify the received 3D skinned model based on the first values;
  execute a differentiable rendering operation to generate a first image which includes a contour of the modified 3D skinned model, wherein the execution of the differentiable rendering operation includes:
    a first operation in which model data comprising the modified 3D skinned model and the estimated set of camera parameters is input to a differentiable renderer, and
    a second operation in which the first image is generated by application of the differentiable renderer on the model data;
  generate, based on the received set of images, a reference image which includes a contour of the second object;

update the first values of the bone parameters associated with the modified 3D skinned model, based on a difference between the generated first image and the generated reference image; and update the modified 3D skinned model based on the updated first values of the bone parameters.

2. The system according to claim 1, wherein the received 3D skinned model includes a set of joints which are parametrically associated with the bone parameters.

3. The system according to claim 1, wherein the received set of images includes the second object from a viewpoint that is same as that of a contour of the first object in the generated first image.

4. The system according to claim 1, wherein the circuitry is further configured to:

compute a difference between the generated first image and the generated reference image, based on a similarity measure; and compute a loss by comparison of the computed difference with a reference value.

5. The system according to claim 4, wherein the circuitry is further configured to compare the computed loss with a threshold loss to determine whether a pose of the modified 3D skinned model matches a pose of the second object.

6. The system according to claim 5, wherein the circuitry is further configured to update, based on a backpropagation operation, the first values of the bone parameters to second values which are different from the first values, and the first values are updated further based on the determination that the pose of the modified 3D skinned model is different from the pose of the second object.

7. The system according to claim 1, wherein the circuitry is further configured to:

determine a pose of the updated 3D skinned model matches a pose of the second object; and determine the updated 3D skinned model as a final 3D model of the first object, based on the determination that the pose of the updated 3D skinned model matches the pose of the second object.

8. The system according to claim 1, wherein the circuitry is further configured to compute a set of per-vertex transformations for the modified 3D skinned model, based on a transformation method that uses the updated first values of the bone parameters as input, and the update of the modified 3D skinned model is based on the computed set of per-vertex transformations.

9. The system according to claim 8, wherein the transformation method comprises at least one of a linear blend skinning (LBS) method or a forward kinematics method.

10. A method, comprising:

receiving a three-dimensional (3D) skinned model of a first object, wherein the received 3D skinned model is associated with an initial pose which corresponds to initial values of bone parameters associated with the received 3D skinned model;

receiving a set of images of a second object which, in appearance, is same as or structurally similar to the first object;

estimating a set of camera parameters based on the received set of images;

updating, based on a random noise, the initial values of the bone parameters to first values which are different from the initial values;

modifying the received 3D skinned model based on the first values;

executing a differentiable rendering operation to generate a first image which includes a contour of the modified 3D skinned model, wherein the execution of the differentiable rendering operation includes:

a first operation in which model data comprising the modified 3D skinned model and the estimated set of camera parameters is input to a differentiable renderer, and a second operation in which the first image is generated by application of the differentiable renderer on the model data;

generating, based on the received set of images, a reference image which includes a contour of the second object;

updating the first values of the bone parameters associated with the modified 3D skinned model, based on a difference between the generated first image and the generated reference image; and updating the modified 3D skinned model based on the updated first values of the bone parameters.

11. The method according to claim 10, wherein the received 3D skinned model includes a set of joints which are parametrically associated with the bone parameters.

12. The method according to claim 10, wherein the received set of images includes the second object from a viewpoint that is same as that of a contour of the first object in the generated first image.

13. The method according to claim 10, further comprising:

computing a difference between the generated first image and the generated reference image, based on a similarity measure;

computing a loss by comparison of the computed difference with a reference value; and comparing the computed loss with a threshold loss to determine whether or not a pose of the modified 3D skinned model matches a pose of the second object.

14. A non-transitory computer-readable medium having stored thereon, computer-executable instructions that when executed by a system, causes the system to execute operations, the operations comprising:

receiving a three-dimensional (3D) skinned model of a first object, wherein the received 3D skinned model is associated with an initial pose which corresponds to initial values of bone parameters associated with the received 3D skinned model;

receiving a set of images of a second object which, in appearance, is same as or structurally similar to the first object;

estimating a set of camera parameters based on the received set of images;

updating, based on a random noise, the initial values of the bone parameters to first values which are different from the initial values;

modifying the received 3D skinned model based on the first values;

executing a differentiable rendering operation to generate a first image which includes a contour of the modified 3D skinned model, wherein the execution of the differentiable rendering operation includes:

a first operation in which model data comprising the modified 3D skinned model and the estimated set of camera parameters is input to a differentiable renderer, and a second operation in which the first image is generated by application of the differentiable renderer on the model data;

generating, based on the received set of images, a reference image which includes a contour of the second object;

updating the first values of the bone parameters associated with the modified 3D skinned model, based on a difference between the generated first image and the generated reference image; and updating the modified 3D skinned model based on the updated first values of the bone parameters.

* * * * *